3,014,847
METHOD OF MALTING
Eric Kneen, Elm Grove, and Harold E. Smith, Madison, Wis., assignors to Kurth Malting Company, Milwaukee, Wis., a corporation of Wisconsin
No Drawing. Filed Dec. 1, 1958, Ser. No. 777,196
11 Claims. (Cl. 195—70)

This invention relates to control of the germination of cereal grain and to improvement of beer quality and brewery yield. More particularly this invention relates to control of barley germination in malting and to improvement of beer and brewery yield through use of the malt produced by the new control.

The malting process comprises the germination of a cereal grain and is generally effected by first steeping the grain in water, allowing it to germinate under controlled conditions of temperature and moisture, and finally drying the germinated grain to the point where growth is stopped. In the usual malting or germination process, for example in the malting of barley, rootlets are formed and grow to lengths up to about ½ inch and the acrospire or coleoptile grows to about the same length as the kernel. Considerable respiration occurs during malting coincident with the growth of the rootlets and acrospire. This invention relates to the control and/or inhibition in part, of the respiration and rootlet growth during the malting process.

During the germination process, for example the production of malt from barley, there is usually a loss of 15 to 20% by weight of the barley including the respiration loss and loss due to rootlet growth. The rootlets are removed from the malt prior to its use so their weight represents a loss, in the weight for weight conversion of barley to malt. It is important therefor to the economics of malting to minimize this loss of weight due to respiration and rootlet growth, and to obtain as high a yield of malt as possible from a given amount of barley.

It is the primary object of this invention to treat the cereal grain during germination with a substance which inhibits the rootlet growth and restricts the respiration without decreasing the quality of the resulting germinated product. With such a process the malting yield is improved and the costs of malting correspondingly decreased.

W. B. M. Urquhart (J. Inst. Brewing, vol. 59, pp. 56–58, January-February 1953) reported on the use of potassium bromate in steep water to improve germination of barley. Subsequent to this Alan Macy and K. C. Stowell (J. Inst. Brewing, vol. 63, pp. 391–398, September-October 1957) told of an additional effect of bromate in the steep water, mainly, restriction of rootlet formation and restriction of respiration. This would, of course, increase the yield of malt from barley and would make the practice quite attractive. However, our studies demonstrate a high residue of bromine (presumably bromide) is left in the malt and in the rootlets. Bromine and bromides are toxic (when tolerance levels are exceeded) and thus the use of bromates is undesirable. Macy and Stowell attempted to use iodates and apparently thought about using chlorites to inhibit respiration and root growth but reported the iodate ineffective and apparently ruled out chlorites because of their known instability in solution.

Contrary to the findings of Macy and Stowell, we have found that both potassium iodate and sodium chlorite are effective in inhibiting rootlet growth and/or respiration when added to germinating barley. We found it necessary to decrease the pH of the germinating barley from the usual about 5.6 to about 3.7 with acetic acid before potassium iodate became effective as an inhibitor. Sodium chlorite, on the other hand, we found to be very effective and useful as an inhibitor without any special adjustments. Since bromates are undesirable because they leave high residues of bromine in the finished products, and iodates are relatively costly for the savings effected in the process, sodium chlorite appears to be greatly advantageous as a germination control agent since it is relatively cheap, easy to apply, effective, and leaves no suspicious residue.

Examples of the use of sodium chlorite for the improvement of yield (decrease of malting loss) during the malting of barley are given in the following:

*Example 1.*—Samples of barley (5,000 g.) were treated with 500 p.p.m. (parts per million parts of barley treated—i.e. 500 pounds sodium chlorite per 1,000,000 pounds barley which is close to 2½ pounds per 100 bushels) of sodium chloride by the addition of sodium chlorite solution at the designated time during the malting. The control barley was treated with an equal weight of water. The malting losses are shown in Table I.

*Table I*

|  | Control | Time of addition of chlorite | | |
| --- | --- | --- | --- | --- |
|  |  | Last steep | After 1 day malting | After 2 days malting |
| Percent malting loss | 17.54 | 17.05 | 15.65 | 16.63 |

The results in Table I show significant and commercially important reductions in malting loss with the use of sodium chlorite. The reduction effected by treating in the last steep is not as great as the others, since the excess steep water is drained off the barley, it is more wasteful of the chlorite. Hence, it is preferred to treat the barley in the germination period ("malting") and better results were obtained when the treatment was after one day instead of after two days.

*Example 2.*—Another test, results shown in Table II showed the relative effect of the quantity of sodium chlorite on malting loss. Samples of 2,500 g. each of barley were treated with the indicated level of sodium chlorite after the first day of malting. The results in Table III also show the malting losses when the various levels of sodium chlorite are added to the samples of barley after the second day of malting.

*Table II*

|  | Control | Level of chlorite treatment | | |
| --- | --- | --- | --- | --- |
|  |  | 50 p.p.m. | 100 p.p.m. | 300 p.p.m. |
| Percent malting loss | 16.08 | 16.00 | 16.44 | 15.24 |

*Table III*

|  | Control | Level of chlorite treatment | | |
| --- | --- | --- | --- | --- |
|  |  | 50 p.p.m. | 100 p.p.m. | 300 p.p.m. |
| Percent malting loss | 15.68 | 15.60 | 15.77 | 15.52 |

Consideration of Tables II and III fortifies the conclusion reached with respect to Table I that the treatment after one day is better than treatment after the second day. The tests also show the higher concentrations give better results with the exception that in both tests the 100 p.p.m. solution produced poorer results than the 50 p.p.m. solution or than the control which was, of course, untreated. No explanation for this performance is suggested.

*Example 3.*—Samples of barley were treated with various levels of sodium chlorite in the manner illustrated in preceding examples. The object of this particular test was to ascertain the effect of high levels of sodium chlorite on the flavor and other qualities of the finished malt. In general, it was found that the sodium chlorite up to 500 p.p.m. did not affect the chemical properties of the malt and that the resulting malt reacted in the usual manner in the production of beer, etc. It was found, however, that the flavor of the malt itself was degraded when levels of sodium chlorite as high as 500 p.p.m. were added to the germinating barley. The effect of the sodium chlorite treatment and the usefulness of other added materials such as sodium carbonate, dextrose, and ammonium nitrate in counteracting the off-flavor are shown in Table IV.

*Table IV*

| Additives p.p.m. | | | | Malt flavor |
|---|---|---|---|---|
| Sodium chlorite | Sodium carbonate | Dextrose | Ammonium nitrate | |
| 0 | 0 | 0 | 0 | Good. |
| 200 | 0 | 0 | 0 | Do. |
| 500 | 0 | 0 | 0 | Bitter after taste. |
| 500 | 500 | 0 | 0 | Very slightly bitter. |
| 500 | 0 | 500 | 0 | Do. |
| 500 | 0 | 0 | 500 | Good. |

The results in Table IV indicate that the bitter after-taste associated with higher levels (500 p.p.m.) of sodium chlorite can be counteracted with the addition to the germinating barley, simultaneously with the sodium chorite, 500 p.p.m. of ammonium nitrate or, to some extent, by the addition of 500 p.p.m. sodium carbonate or dextrose.

*Example 4.*—The results shown in Table IV indicate that sodium carbonate has some beneficial action in counteracting the bitter after-taste of high levels of sodium chlorite. Malting loss results shown in Table V, which were obtained when 5,000 g. samples of barley were treated after the steeping with the indicated levels of sodium chlorite and/or sodium carbonate. The results in Table V show that sodium carbonate by itself does not affect the malting yield (does not lower the percent malting loss) but seems to enhance the effect of the sodium chlorite, i.e. the two substances are synergistic.

*Table V*

| | Control | 200 p.p.m. sodium chlorite | 200 p.p.m. sodium carbonate | 200 p.p.m. sodium chlorite plus 200 p.p.m. sodium carbonate |
|---|---|---|---|---|
| Percent malting loss | 17.04 | 16.25 | 17.00 | 15.85 |

*Example 5.*—Two commercial size lots of barley (2,600 bushels per lot) were malted simultaneously under the same conditions, with and without sodium chlorite treatment. The level of treatment was 200 p.p.m. sodium chlorite added four hours after the barley had drained from steeping. It was observed that the percent of the grains showing evidence of germination after 24 hours was 78% for the sodium chlorite treated sample and 50% for the control. The over-all malting loss was decreased by 1% when sodium chlorite was used.

From the preceding examples it can be concluded that the addition of about 200 p.p.m. sodium chlorite to germinating barley, preferably during the first 24 hours of malting, is an effective way of increasing the malt yield. To our knowledge sodium chlorite is unique over other proposed chemicals for this use, in that, it is entirely practical in cost, ease of use, and does not leave residues of questionable materials in the finished product. Higher levels of sodium chlorite are more effective but are somewhat disadvantageous by leaving a bitter after-taste in the finished malt. This bitter after-taste can be counteracted very effectively, however, by the use of ammonium nitrate.

The end use of a large percentage of malt is in the brewing process and adequate data indicates that 250 p.p.m. is satisfactory from a brewing quality standpoint (as well as 200 p.p.m. or less) in that taste is no problem. These investigations also indicate that the beer stability and brewery yield are improved markedly when using chlorite treated malt in the brewing process.

*Example 6.*—Malts were prepared using chlorite at various levels sprayed on the barley immediately after steeping. These malts were then brewed in the customary fashion in a ¼ barrel pilot brewery with the results shown in the following Table VI.

*Table VI*

| Brewing performance | Treatment | | | |
|---|---|---|---|---|
| | Water only | Chlorite at indicated level | | |
| | | 100 p.p.m. | 200 p.p.m. | 250 p.p.m. |
| Brewery yield | 72.6 | 73.2 | 73.8 | 74.0 |
| Filtration | Normal | Normal | Normal | Normal |
| Kettle break | Normal | Normal | Normal | Normal |
| Fermentation | Normal | Normal | Normal | Normal |
| Beer flavor | Normal | Normal | Normal | Normal |
| Beer Foam | Normal | Normal | Normal | Normal |
| Beer stability: | | | | |
| 30 days chill [1] | 105 | 54 | 45 | 42 |
| 30 days heat plus 3 days chill [2] | 420 | 384 | 345 | 336 |
| 30 days heat plus 3 days at 40° F.[3] | 321 | 249 | 186 | 264 |

[1] All "stability numbers" are haze readings in nephlos units—the higher the figure the more hazy the beer. "Chill" is 32° F.
[2] 30 days at 120° F. followed by 3 days at 32° F.; this is a very abusive treatment.
[3] 30 days at 120° F. followed by 3 days at "drinking temperature"; i.e., 40° F.

These results demonstrate that the brewery yield increases with the level of chlorite in the treatment of the barley. This very important economic improvement has been confirmed in a further experiment in which the control malt gave a brewery yield of 68.0% while the chlorite treated malt gave a yield of 69.2%.

Table VI shows the resistance of the beer to the type of abuse it might receive in the trade is markedly better for the chlorite treated malts and the resistance (stability) is improved with increasing levels of chlorite. This improvement may possibly be attributable to the oxidation that has taken place in the malting process.

The very important improvement in stability and brewery yield attributable to use of chlorite treated malt are added benefits and in no way alter the fact that the malt recovery is also enhanced by the chlorite treatment, as in indicated by the malting loss data for the malts used in the experiment reported in Table VI. This malting loss data is given in the following table VII.

*Table VII*

| Treatment | Malting loss, percent |
|---|---|
| 0 | 17.00 |
| 100 p.p.m. chlorite | 16.56 |
| 200 p.p.m. chlorite | 16.16 |
| 250 p.p.m. chlorite | 15.80 |

It follows, therefore, that the chlorite treatment increases the yield of malt in the malting process and the use of chlorite treated malts in brewing improves beer stability and gives an economically important increase in brewery yield.

Further studies along the lines suggested in the examples would, no doubt, evolve further refinements and parameters and for that reason this invention is to be limited only by the scope of the claims.

We claim:

1. A malting process including the steps of steeping, germination and kilning comprising the improvement of treating the grain with a solution of sodium chlorite after steeping has been completed and prior to kilning, whereby the rootlet growth and respiration of the barley grain is inhibited during the malting process.

2. The process according to claim 1 in which the treatment occurs during the first thirty-six hours of germination.

3. The process of claim 1 in which the solution also contains sodium carbonate.

4. The process of claim 1 in which the solution also contains ammonium nitrate.

5. The process of claim 1 in which the solution contains an added material selected from the group consisting of ammonium nitrate, sodium carbonate and dextrose to control the flavor of the malt produced.

6. The process of claim 1 in which the sodium chlorite level in the solution is between 100 and 500 parts per million.

7. The process of claim 1 in which the sodium chlorite level in the solution is between 200 and 500 parts per million.

8. A malting process in which the barley grain is treated with a solution of sodium chlorite in water between the steeping and kilning steps, the sodium chlorite level being between 200 and 500 parts per million.

9. The process of claim 8 in which the solution also contains sodium carbonate.

10. The process of claim 8 in which the solution also contains ammonium nitrate, the level of the chlorite being greater than 300 parts per million.

11. The process of claim 8 in which the treatment occurs within the first thirty-six hours of germination.

References Cited in the file of this patent

UNITED STATES PATENTS

| | | |
|---|---|---|
| 179,700 | D'Heureuse | July 11, 1876 |
| 2,379,335 | Baker | June 26, 1945 |

OTHER REFERENCES

"Industrial Microbiology," by S. C. Prescott and C. C. Dunn, 2nd edition, published 1949 by McGraw-Hill Book Co., Inc., pp. 62 to 66.